US009440831B2

(12) United States Patent
Goodheart

(10) Patent No.: US 9,440,831 B2
(45) Date of Patent: Sep. 13, 2016

(54) UTILITY TOOL CARRIER SYSTEM

(71) Applicant: Sheldon Goodheart, Kindersley (CA)

(72) Inventor: Sheldon Goodheart, Kindersley (CA)

( * ) Notice: Subject to any disclaimer, the term of this patent is extended or adjusted under 35 U.S.C. 154(b) by 0 days.

(21) Appl. No.: 14/268,568

(22) Filed: May 2, 2014

(65) Prior Publication Data

US 2014/0326841 A1 Nov. 6, 2014

(30) Foreign Application Priority Data

May 2, 2013 (CA) ..................................... 2814563

(51) Int. Cl.
*F16M 11/00* (2006.01)
*B66F 11/04* (2006.01)
*E04G 7/16* (2006.01)

(52) U.S. Cl.
CPC *B66F 11/04* (2013.01); *E04G 7/16* (2013.01)

(58) Field of Classification Search
CPC ............. E06C 7/00; E06C 7/14; E04G 7/14; E04G 7/12; B66F 11/04
See application file for complete search history.

(56) References Cited

U.S. PATENT DOCUMENTS

| | | | | | |
|---|---|---|---|---|---|
| 3,009,677 | A | * | 11/1961 | Munnikhuysen | 248/357 |
| 3,067,903 | A | * | 12/1962 | Jones, Jr. | 220/552 |
| 8,123,000 | B2 | * | 2/2012 | Whitaker | 182/129 |
| 2012/0325992 | A1 | * | 12/2012 | Keshock | B66F 11/042 248/215 |
| 2014/0306085 | A1 | * | 10/2014 | Clark | 248/544 |

* cited by examiner

*Primary Examiner* — Amy Sterling

(74) *Attorney, Agent, or Firm* — Moss & Barnett; Michael A. Bondi

(57) ABSTRACT

A transportable tool and accessory carrier for use on aerial lifts is disclosed. The system comprises a carrier configured to mount on an upper railing member of an aerial lift, and moveable support members to permit the carrier to be secured to a lower railing member as well. In some cases the support members are telescoping in order to more easily move between a stowed and operating configuration, and to easily fit a range of aerial lift railing member configurations.

7 Claims, 9 Drawing Sheets

UTILITY TOOL CARRIER SYSTEM

FIELD OF INVENTION

The present invention is in the field of utility trays; in particular utility trays adapted for use with aerial lift platform systems.

BACKGROUND

Aerial lift systems, sometimes known as scissor lifts or hydraulic lifts are well known in the construction and utility repair trades. In general, these lift systems are designed to lift a worker as well as tools and materials to an elevated location where the worker can then perform some task such as installation, repair or removal of some structure or object.

Although very useful, these lifting systems have their limitations. One limitation is that it is generally desirable for the worker to have tools and materials secured when on the lift so that these items do not fall, creating a safety hazard to those below and near the lift system. Another limitation is that in general the amount of working space available for the worker, as well as for any tools and materials that person may need to perform their job, is limited. Improving the efficiency of tool and accessory storage on an aerial lift platform is highly desirable.

As a result, there is a need for accessories suitable for use with lift that allow a worker to safely carry tools and materials on the lift, while maximizing the convenience to the worker. There are several prior art solutions that have attempted to address the problems of safety and available space on a lift. For example, some workers wear a tool belt designed to provide easy access to necessary tools. While tool belts are useful in providing access to tools and preventing tools from being loose on the lift, they are nonetheless limiting in their effectiveness. In addition, in areas where government regulations require workers to wear safety harnesses when working on elevated platforms, tool belts become impractical as they continually interfere with the safety harness, in turn limiting worker mobility.

Even where harnesses are not required, depending on the nature of the work to be done, tool belts present other problems. For example, the needed tools may be heavy resulting in increased fatigue or even injury to a worker who is carrying such tools around all day long on a belt. In some cases, certain tools or other pieces of material or equipment may not fit in the space afforded by a typical tool belt. Similarly, tool belts may limit the mobility of the worker or adversely affect their balance, potentially creating a different type of hazard.

One prior art attempt to solve these problems is provided by U.S. Design Patent No. D675824 (Demore) that discloses a tool tray that fits in the corner of a lift platform. However, this design is limited by the fact that it mounts internally and as a result takes up platform space, limiting the abilities of the worker.

Others have designed various types of holders configured to attach to the outside of a lift platform railing member. For example, U.S. Patent Application Publication No. 2007/0187184 (Nasuti et al.) discloses a lift utility tray system that attaches to the side of a standard scissor lift platform. The disclosed system is designed to hold tools in individualized container structures and make them accessible to a worker. However, the disclosed design suffers from some serious and potentially dangerous limitations, the most obvious of which is that there is nothing to prevent the loss of a tool from the lift platform if the worker does not properly place the tool back into its particular holder.

Still another design, U.S. Patent Application Publication No. 2012/0325992 (Keshock), discloses an aerial lift platform comprising a tray design to fit over the top railing member of a lift platform, and a brace, designed to abut a lower bar on the platform. The tray can be mounted inside or outside of the platform workspace. In addition, the brace is designed to swivel out of the way when not in use in order to provide easier transport of the tray. Despite the advantage of being mountable on the outside of the platform, this design also suffers from limitations, most notably the fact that the brace does not engage or otherwise secure the lower platform bar, resulting in the potential for the entire tray system to bounce in response to movement of the platform, or to slide along the top railing member. Similarly, the brace is not adjustable and so the system may not be readily adaptable to lift systems with differing spacing between upper and lower railing members on the platform.

As a result, there remains a need for a tool carrier system that can be secured to the outside railing member of a lift platform, which is adaptable for use with a wide range of lift platform configurations, and which can safely hold tools and other objects while providing easy access to a worker.

SUMMARY OF THE INVENTION

As indicated above, there remains a need for an tool carrier system that can be secured to the outside railing member of a lift platform having at least two railing members thereon defining a safe movement and working area, which is adaptable for use with a wide range of lift platform configurations, and which can safely hold tools and other objects while providing easy access to a worker. The present disclosure describes embodiments of a tool carrier system adapted to be secured outside the normal movement area of an aerial lift by mounting outside the railing member of the lift.

In one aspect a tool carrier system comprises a carrier being a tray, which includes a U-shaped mount that allows the carrier to be hung on an upper railing member of a lift. In some cases, the U-shaped mount can be further secured to the upper railing member by fasteners. The tool carrier system further includes at least one support member that can engage a lower railing member in order to support the carrier on the outside of the aerial lift railing member.

In another aspect of the present disclosure, the support members can be made to be adjustable and in some embodiments they can be telescoping. Telescoping support members provide a further advantage when storing the system for transport from one job site to the next, or for storage, in that the support members can be tucked away reducing the risk of damage and improving ease of transport and storage.

The tool carrier system may also provide at least one accessory holder, such as racks designed to support pipe, conduit, lumber and the like. The tool carrier system can also be used to support a lighting support member, where work requires additional lighting, such as at night time or indoors where insufficient natural or existing illumination are insufficient.

Thus, the present disclosure provides an tool carrier system adapted for use with an aerial lift platform comprising: a carrier configured to receive tools for use by a worker, and to be mountable to an aerial lift platform comprising a plurality of railing members defining a safe movement area in which a worker normally performs a task; a mount to reversibly secure the carrier to a first railing member of the aerial lift platform; at least one support member configured to reversibly secure the carrier to a second railing member of the aerial lift platform; and wherein the tool carrier system is configured to be mounted such that the carrier is located substantially outside the movement area.

In some embodiments, the carrier comprises a tray.

In some embodiments, the at least one support member comprises a telescoping support member that can be moved from a first length to a second length. In some embodiments, the at least one support member further comprises at least one locking pin to maintain the at least one support member in a desired configuration. In some embodiments, the at least one support member can be moved from a stowed position to a deployed position. In some embodiments, the at least one support member can be reversibly fastened to a second railing member.

In some embodiments, the carrier further comprises at least one slot into which a divider can be placed such that the carrier can be divided into more than one discrete storage area.

In some embodiments, the tool carrier system further comprises at least one accessory holder. In some embodiments, the accessory holder comprises at least two hangar members configured to cooperatively support elongate objects on a carrier mounted to an aerial lift platform.

In some embodiments, the accessory holder is configured to support a lighting fixture.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION

The following discussion provides examples of embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Those of skill in the art will recognize that the described embodiment are examples of possible configurations of the invention, and are not intended to be limiting to the scope of the invention. Accordingly, the drawings and descriptions contained herein are to be regarded as illustrative of the invention as set forth in the accompanying claims.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. In cases where dimensions or other measurements are provided in illustrations or the accompanying description, it is not intended that any such information is to be interpreted as limiting the scope of the invention.

The present invention provides a tool carrier system that overcomes limitations in prior art attempts at providing tool carriers for use on aerial lift platforms. In general, the present invention provides the ability to securely carry tools, materials and other accessories either inside or outside the lift platform movement or working area, and to provide easy access to these items to a worker on the platform. The tool carrier system is also designed to include features to allow it to adapt to virtually any aerial platform design, and to be partially collapsible for storage and transport.

Figure 1:
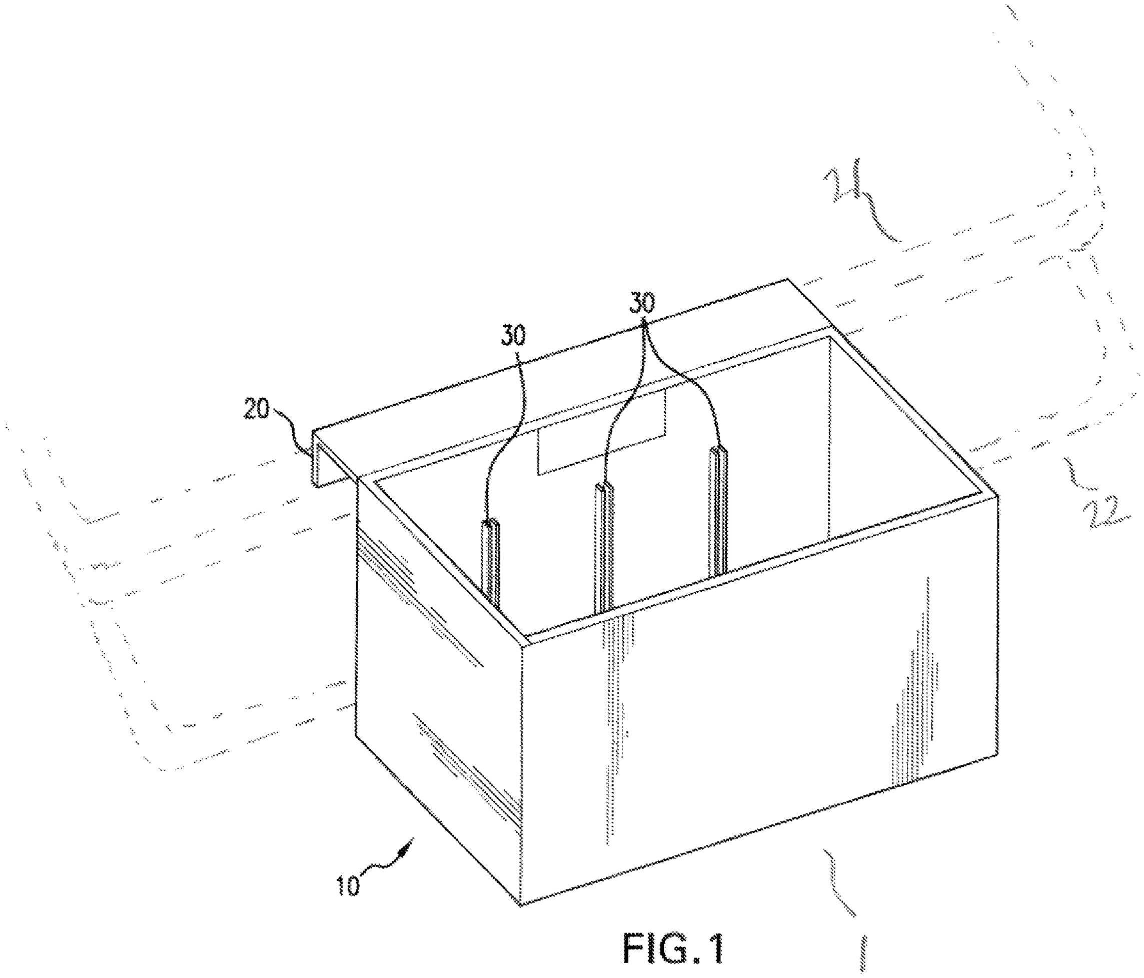
FIG. 1 is a perspective view of an embodiment of a tool carrier system for use with an aerial lift platform, in accordance with the present invention.

As shown in FIG. 1, an embodiment of the present tool carrier system comprises a carrier which is a tray 10. The carrier includes a U-shaped mount 20 that is adapted to fit over a first railing member of an aerial lift platform. In general the U-shaped mount would engage a top railing member of the aerial lift platform, but it may also be useful to have the tray top set on an intermediate level railing member. Depending on the spacing of the railing members on the aerial lift platform, and the depth of the carriers/tray (s) it would be possible to thereby "stack" trays at a location along the railing member, providing even more storage space to the worker.

Figure 2:
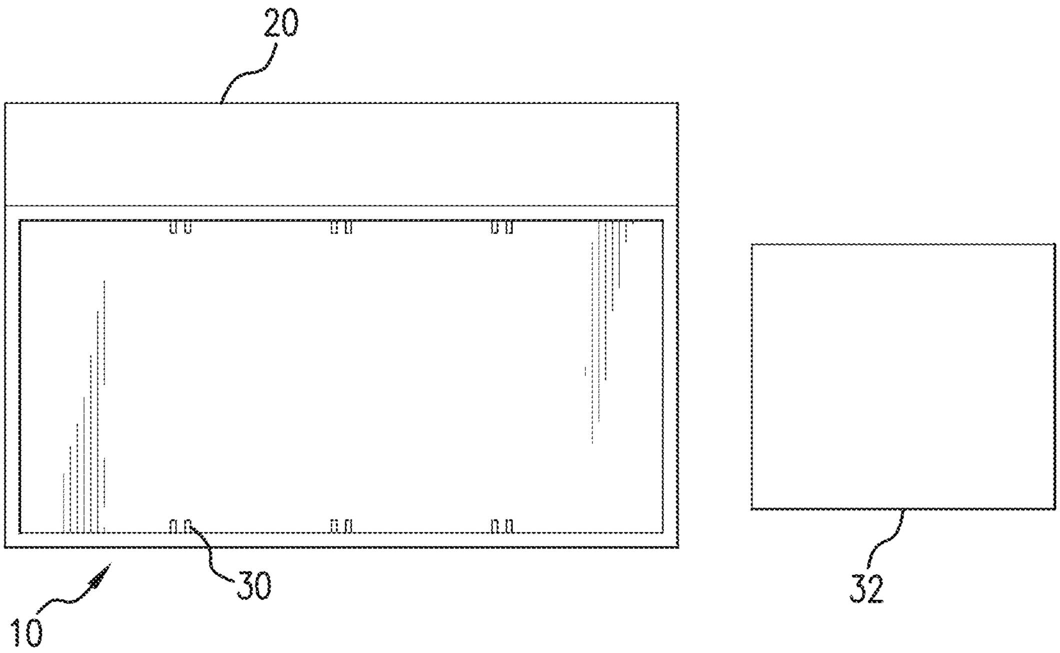
FIG. 2 is a top view of the tool carrier system depicted in FIG. 1, along with an example of a divider member.
Figure 8:
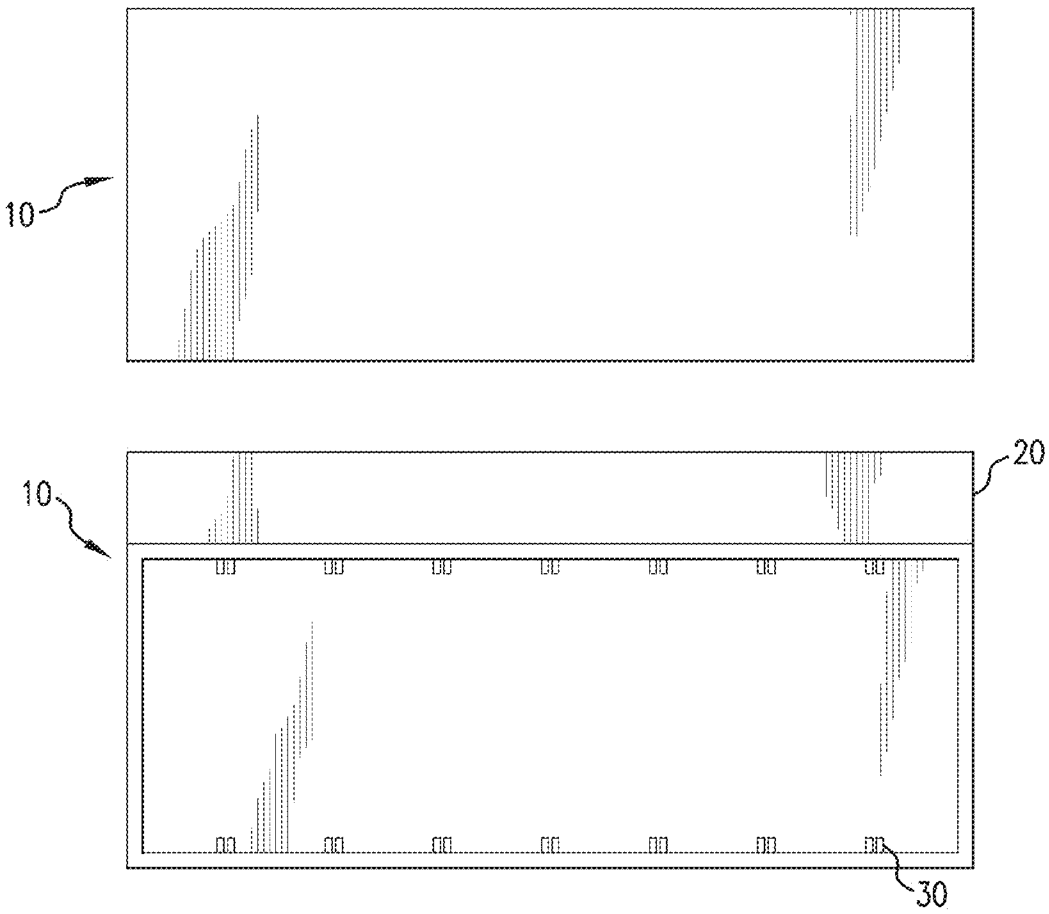
FIG. 8 provides front and top views of another embodiment of an tool carrier system for use with an aerial lift platform having divider slots within the carrier.

FIGS. 1, 2 and 8 show various embodiments of a carrier tray 10 for use in the present invention, wherein the tray 10 further comprises slots 30 that can be adapted to engage one or more dividers 32. Dividers can be useful in permitting a worker to sort tools, or to otherwise keep items in separate compartments within the tray 10. For example, it may be desirable to keep fasteners in one compartment, and tools in another. Similarly, it can be useful to separate electrical tools from each other in order to avoid tangling of power supply cords. In some embodiments, dividers may be installed by simply sliding into a desired slot.

FIG. 1 shows the carrier 10, and shows in dotted relief a first railing member 21 and a second railing member 22 of the aerial lift platform. This Figure is intended to show the overall assembly of the tool carrier system of the present invention onto an aerial lift platform.

Figure 3A:
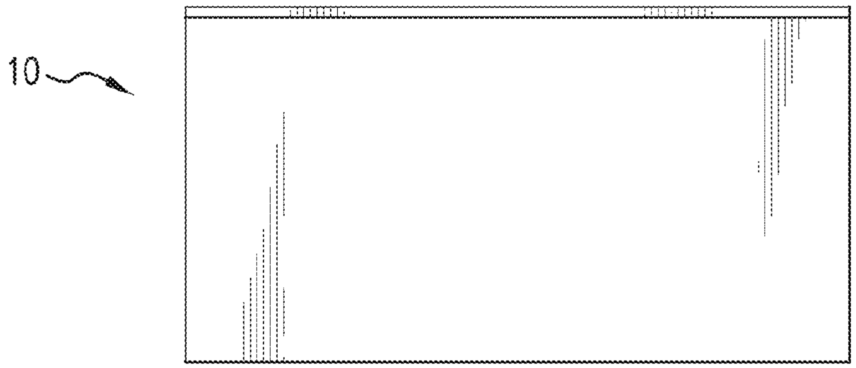
FIG. 3 provides (A) front; (B) back; and (C) side views of an embodiment of a tool carrier system.
Figure 3B:
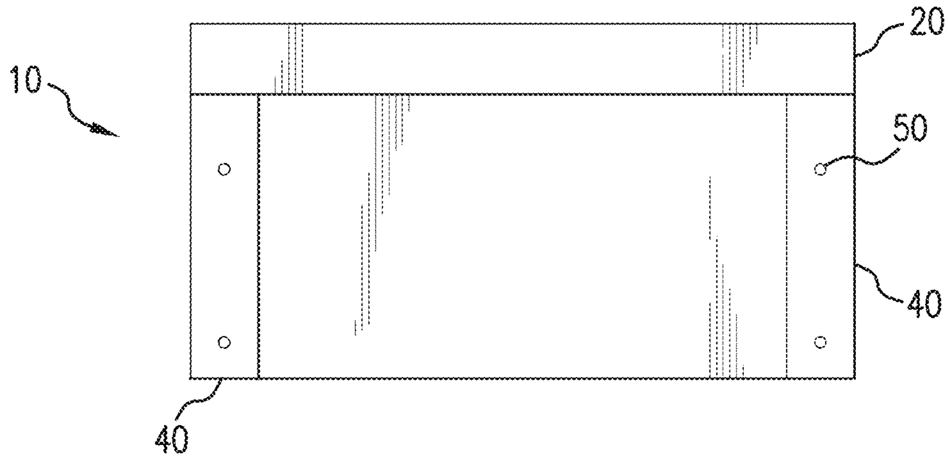
Figure 3C:
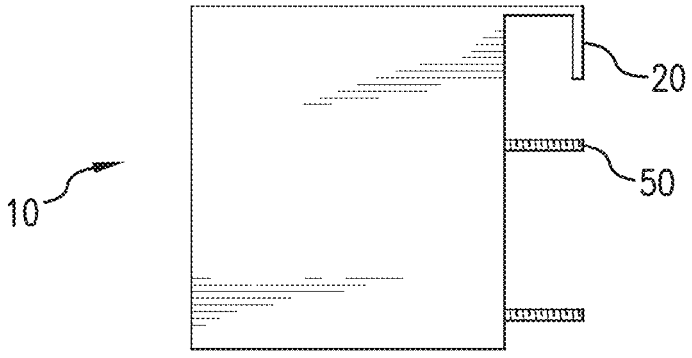

FIG. 3 shows various views of an embodiment of a tool carrier system tray. The tray 10 can include thickened plates 40 generally placed along the lateral margins of the tray 10 that provide additional strength and increased rigidity of the carrier tray 10. These supports can further comprise bolt posts 50 configured to engage a railing member below the one upon which the U-shaped member located along the top and one edge of the tray is positioned. The relationship of the bolt post and U-shaped member are best appreciated in the bottom view provided in FIG. 3. It will be obvious to those of skill in the art that the placement of bolt post will be a design choice and not a limiting feature of the invention.

Figure 4A:
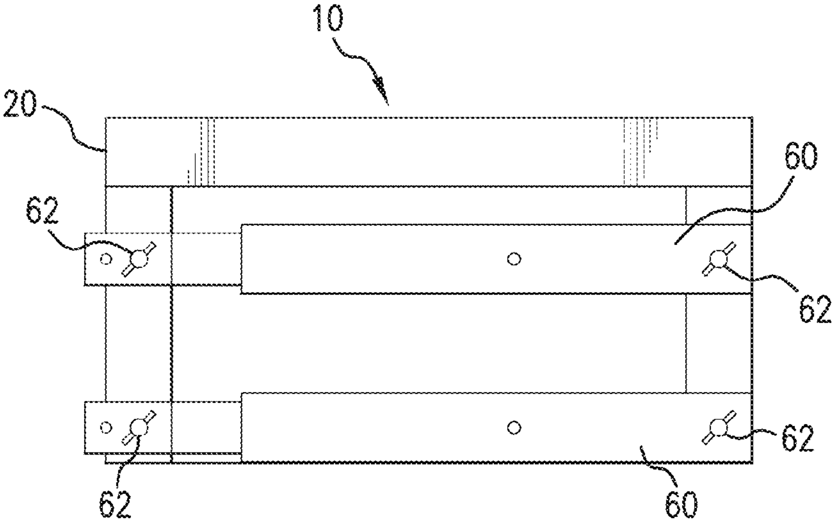
FIG. 4 provides a side view of an embodiment of retractable and adjustable support members of an tool carrier system for use with an aerial lift platform, wherein the support members are (A) stowed; and (B) deployed.
Figure 4B:
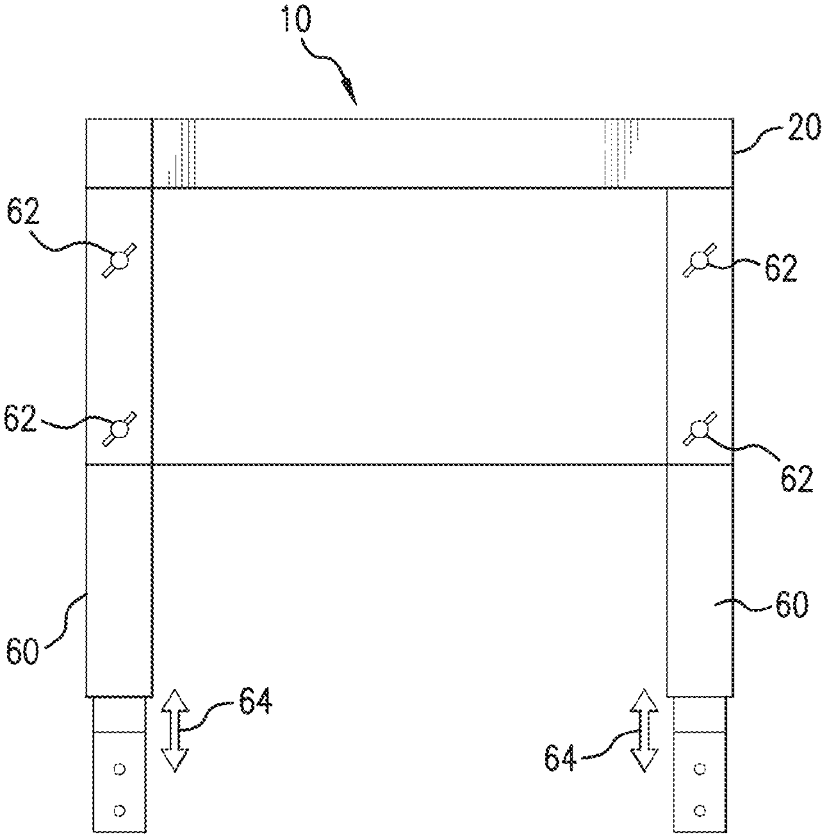
Figure 5A:
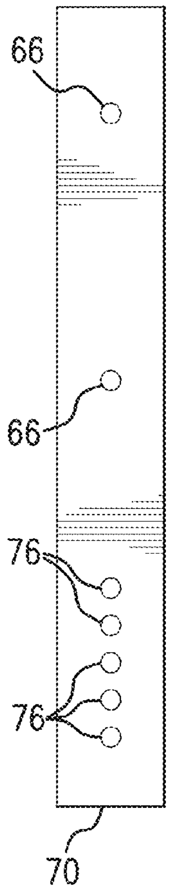
FIG. 5 provides further details of an embodiment of a telescoping support member showing front (A) and (B) side views of the upper portion; and front (C) and side (D) views of the lower portion of a telescoping support member.
Figure 5B:
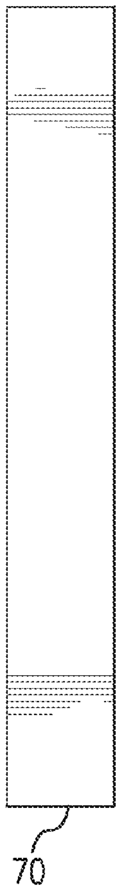
Figure 5C:
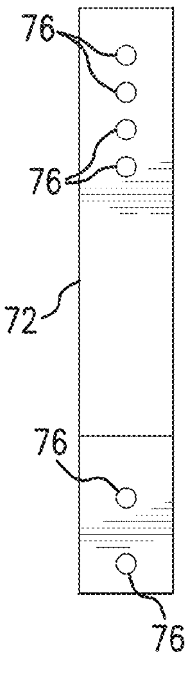
Figure 5D:
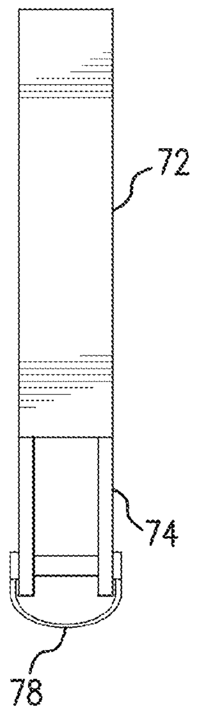

In some embodiments, one of which is depicted in FIG. 4, the system 1 further provides retractable and adjustable support arm members 60 that serve as support arm members 60 for the tray. As shown in FIG. 4A, these support arm members 60 can be pivotally attached to the tray 10 by a wing nut or other suitable fastener 62, and can be placed in a "transport mode" wherein the support arm members 60 are folded up alongside the body of the tray 10. As shown in FIG. 4B, when placed in the "in use" mode, the support arm members 60 can be pivoted generally downward and perpendicular to the top edge of the tray 10. In some cases it will be desirable to have the support arm members 60 extend at substantially right angles to the top of the tray 10. In other cases it may be desirable to splay the support arm members 60 either inwards or outwards in order to be able to effectively engage a lower railing member on the aerial lift platform, or to provide additional stability to the tray 10. The arrows 64 indicate the ability to adjust the support arm members 60 up and down as required.

As shown in FIG. 5A-D inclusive, in some embodiments the support arm members 60 (or support members) can be configured to be telescoping. In these embodiments, each support arm member 60 will generally comprise an upper arm 70 and a lower arm 72. In the depicted embodiment the arms are fashioned such that the lower arm 72 slidably fits within the upper arm 70. The dimensions of the arms are chosen such that the arms can slide relative to each other. The arms can further include one or more boltholes 76 to enable the two arms to be secured to each other with fasteners once the assembly is extended to the desired length. In some embodiments, the upper and lower arms can include a plurality of boltholes 76 can be provided in order to provide a range of positions over which the length of the telescoping assembly can be adjusted and secured. The upper arm will also include additional boltholes 66 to enable the upper arm to be secure to the tray.

Figure 6:
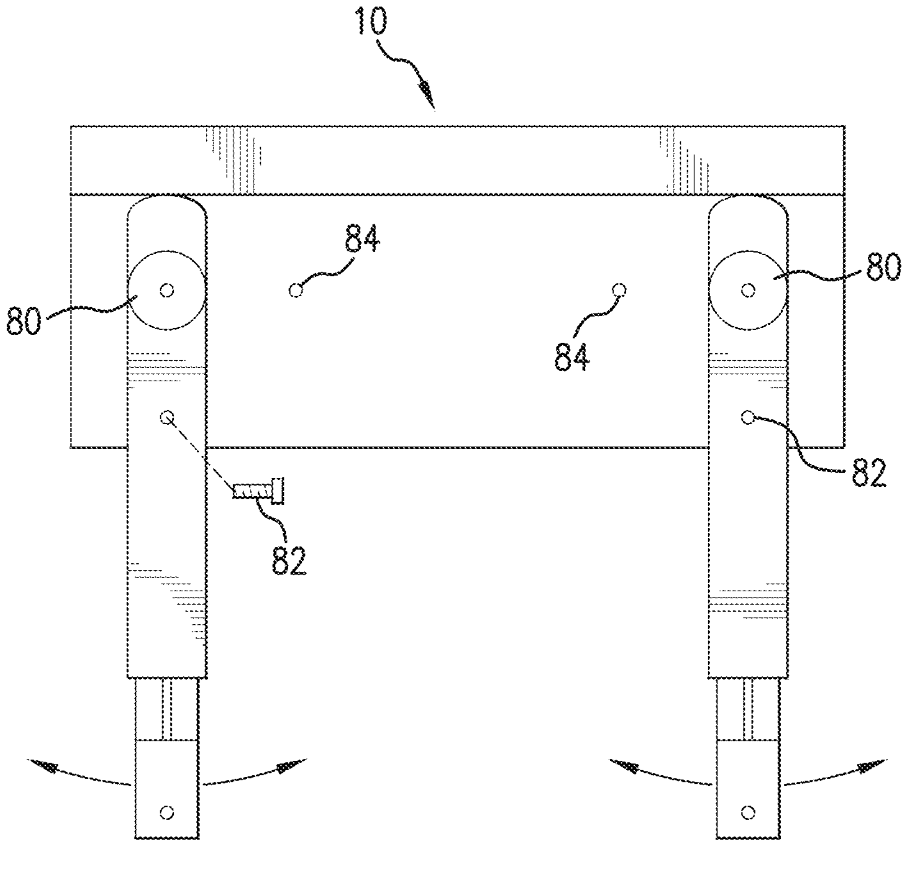
FIG. 6 provides further detail of an embodiment of retractable and adjustable support members pivotally attached to an embodiment of an tool carrier system.

In some embodiments, the lower arm can further comprise a U-shape member 74 that can engage a lower railing member on an aerial lift platform in much the same way that the U-shaped member on the tray engages an upper railing member. In addition, the U-shaped member on the lower arm can include U-shaped (or other suitably shaped) fastening member 78 to provide a point of attachment to a lower railing member on a lift platform so that the entire assembly can be securely fastened if so desired. Each upper arm As shown in FIG. 6, each arm assembly can be pivotally rotated independent of the other, the direction of pivoting around the pivot point 80 shown by the arrows. In the depicted embodiment two leg assemblies are shown, although it is foreseeable that trays having more than two support arm members 79 might be desirable in order to provide a longer tool carrier system, or to support very heavy loads safely. FIG. 6 further depicts the use of retractable pins 82 for use as anchors and that the retractable pins 82 engage the support arm member 79 spaced-apart from the pivot point 80. Such anchors are well known in the art. Using retractable anchors would make the installation or removal simpler than other types of fasteners. A retractable pin anchor might also be used as shown to lock a support arm member 79 into a particular position. In general, those of skill in the art will appreciate that there are a number of different fastener and locking mechanism devices that will be suitable for use with the present invention. Thus, the particular type of fastener shown in the present description is not intended to limit the scope of the invention in any way. The tray may also include one or more pin point hole positions 84 in which the support arm member 79 can be secured by inserting a locking pin or other suitable fastener through the support arm member 79 and into a complementary positioning hole in the tray.

Figure 7A:
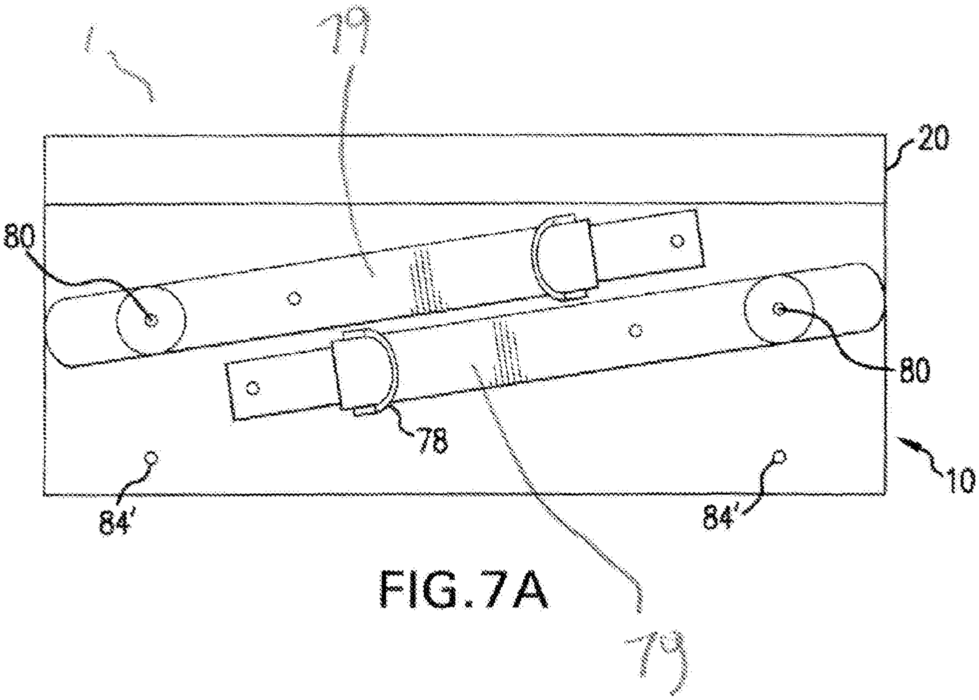
FIG. 7 provides further details of an embodiment of retractable and adjustable support members attached to a carrier including support members (A) in the stowed configuration; (B) back, front and side views of an embodiment of an upper support member; and (C) back, front and side views of an embodiment of a lower support member.

FIG. 7 shows additional embodiments of various adjustable/retractable support arm members. In FIG. 7A, the support arm members are shown in the stowed or storage position, as one might use when storing or transporting the carrier from one jobsite to another. In this embodiment the leg assemblies are secured to the tray at a pivot point 80. The pivot allows the leg to be easily moved from the stowed position to a deployed position as shown in FIG. 6. In some embodiments, retractable locking pins 82 may be used in various places; in this case they can be used to secure a leg in either the stowed or deployed positions by engaging corresponding holes in the body of the carrier tray, conveniently placed in positions on the side of the tray portion of the tool carrier system assembly.

In FIG. 7A, the support arm members are hanger assemblies 79 which as depicted are telescoping and are shown such that the retractable pin engages one pin point hole 84. In this position the support arm members 79 are secured in the stowed position with the retractable pin engaged in the hole. In some embodiments the retractable pin can comprise a quick release pin well known in the art.

When it is desired to move a support arm member 79 to the deployed position, the retractable locking pin can be pulled out of a pin point hole, freeing the support arm member 79 to rotate about the axis of the pivot point 80. Rotation of the support arm member 79 about the pivot point will bring the retractable pin into alignment with a second pin point 84'. Releasing the retractable pin will allow the pin mechanism to move into this second hole, thereby locking the support arm member 79 in a deployed position.

Depending on the number and position of these additional pin point holes 84, 84', the support arm member 79 can be deployed at a number of predetermined angles relative to the carrier tray portion. In the embodiment shown in FIG. 6, the pin point hole for deployment can be positioned such that the support arm members 79 are substantially perpendicular to the upper edge of the carrier tray. Other embodiments where the support arm members 79 could be deployed at angles other than 90° are also within the scope of the invention. For example, a support arm member 79 could be deployed an angle of 45°, in order to splay the bottom of support arm member 79 outward relative to the pivot point, in order to provide more stable support for the tray 10.

Figure 7B:
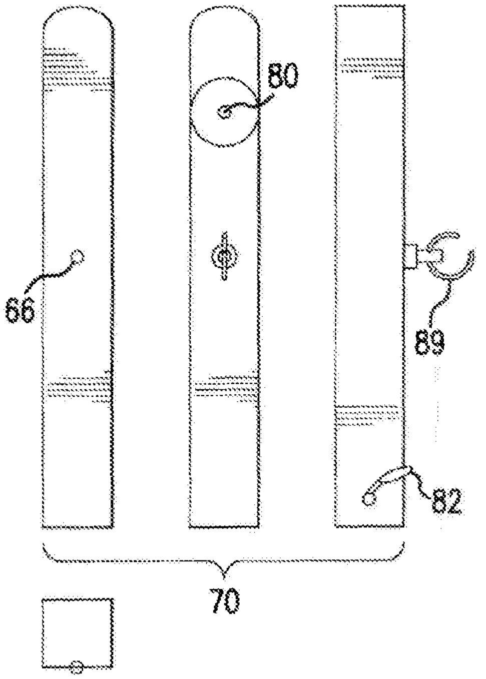
Figure 7C:
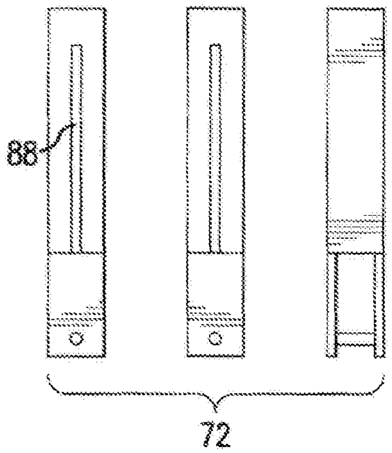

FIGS. 7B and 7C depict exemplary embodiments of upper and lower leg assemblies shown in back, front and side view. In some cases the leg assemblies can include a track 88 and track pin 89 arrangement. In these embodiments, the track 88 can be fashioned to provide pre-defined limits to the range of motion of the upper and lower leg portions relative to each, and to prevent the upper and lower leg portions from coming apart inadvertently either during assembly and installation or disassembly from the aerial platform. A pin 89 engages the track such that the lower leg 72 is able to slide up and down, the limits of its range defined by the length of the track.

Figure 9A:
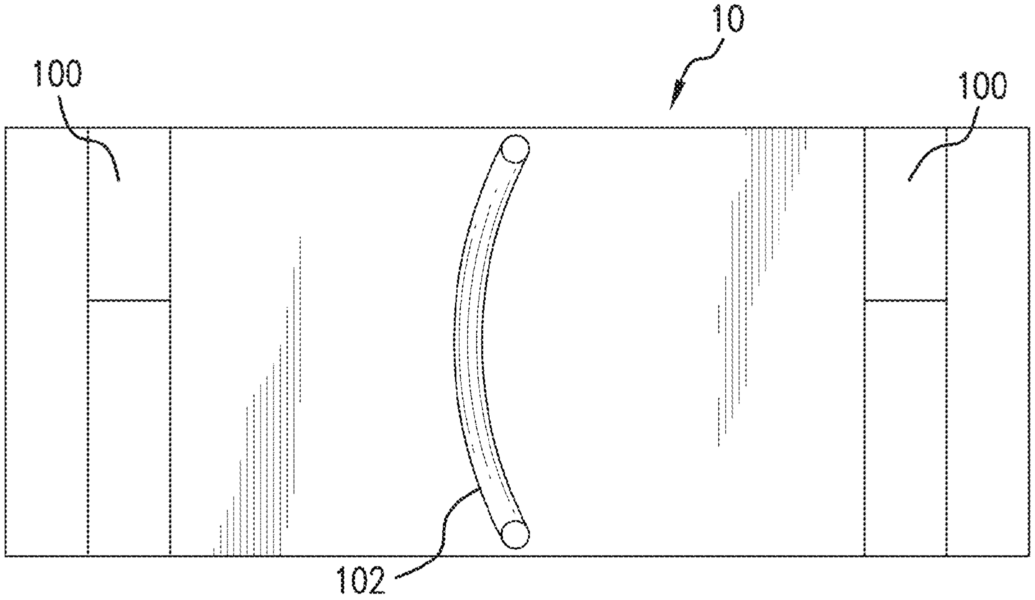
FIG. 9 provides views of an embodiment of an accessory rack unit suitable for use with an aerial lift platform where (A) two racks are mounted to the back of a tray; (B) a side view of an individual accessory rack is shown, along with (C) a member to provide internal bracing of an accessory rack.

In some cases, it may be desirable to provide an accessory carrier that comprises something other than a tool tray. For example, as depicted in FIG. 9, the system can comprise a U-shaped bracket 100 that is adaptable for carrying materials such as lumber, conduit pipe, and other such rigid or semi-rigid elongate objects. As shown in FIG. 9A, there can also be provided a holding strap or safety strap 102 to secure these objects in place. In this type of configuration there will generally be two support members secured to a railing member on the aerial lift platform, one supporting each end of the objects to be carried as shown in FIG. 9A. The positioning of the members relative to each other will depend on both the length and relative rigidity of the objects being secured to the carrier. In some case, support members can be placed at intermediate positions along the length of the material(s) being carried in order to provide better support. For example, it is anticipated that long pieces of PVC pipe of narrow gauge would provide a greater number of support points that would say regular length pieces of lumber. The present invention can be easily adapted to provide such configurations.

Figure 9B:
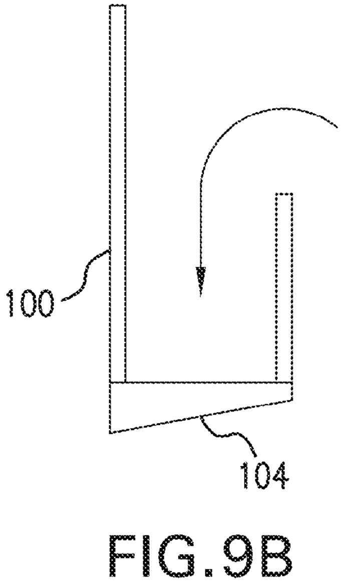
Figure 9C:
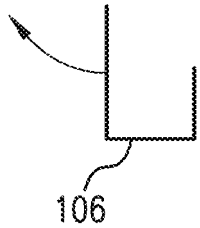

As shown in FIGS. 9B and 9C, accessory carrier 100 members can also be fashioned with an external support member 104 (FIG. 9B), to provide additional rigidity to the carrier, and/or an internal support member 106 (FIG. 9C), that can be placed within the interior of the accessory carrier.

In other cases, it may be desirable to provide a system 1 designed to support lighting for when work is carried out in low light conditions, such as indoors or at night. Various lighting systems could be mounted to the aerial lift platform. The present invention, as has been described for the tool carrier system configurations, is readily mounted on the outside of the platform railing member, so that the lighting system would not take up or otherwise interfere with the limited working space available on typical aerial platforms.

It will be recognized that the specific materials used in constructing the various components of the system described herein, are not considered to be limiting to the scope of the invention. Those of skill in the art will readily recognize and be able to select materials and components that will accomplish the objectives of the invention without requiring any inventive skill.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A tool carrier system for use with an aerial lift platform comprising at least two railing members defining an enclosed movement area within which a worker normally performs a task, said tool carrier system comprising:

a carrier that is mountable to the aerial lift platform and that is configured to receive tools for access by a worker within the movement area;

a mount to reversibly secure the carrier to a first railing member;

at least one support arm member;

a pivot point that pivotally attaches the at least one support arm member to the carrier, wherein the at least one support arm member reversibly secures the carrier to a second railing member;

a locking pin that is spaced-apart from the pivot point, wherein the locking pin engages the at least one support arm member and the carrier to maintain the at least one arm member in a configuration with respect to the carrier; and wherein when the system is mounted to the aerial lift platform, the carrier is located substantially outside the movement area.

2. The system of claim 1, wherein the carrier comprises a tray.

3. The system of claim 1, wherein the at least one support arm member comprises a telescoping assembly that can be moved from a first length to a second length.

4. The system of claim 1, wherein the at least one support arm member can be moved from a stowed position to a deployed position.

5. The system of claim 1, wherein the at least one support arm member can be reversibly fastened to the second railing member.

6. The system of claim 1, wherein the carrier further comprises at least one slot into which a divider can be placed such that the carrier can be divided into more than one discrete storage area.

7. The system of claim 1, wherein the carrier system further comprises at least one accessory holder comprising at least two hanger members configured to cooperatively support elongate objects on the carrier.

* * * * *